Dec. 8, 1953  O. E. SAARI  2,662,220
CLAMPING DEVICE FOR ELECTRONIC DISCHARGE DEVICES
Filed May 6, 1950

INVENTOR.
OLIVER E. SAARI
BY
*George H Fisher*
ATTORNEY

Patented Dec. 8, 1953

2,662,220

UNITED STATES PATENT OFFICE 2,662,220

CLAMPING DEVICE FOR ELECTRONIC DISCHARGE DEVICES

Oliver E. Saari, Minneapolis, Minn., assignor to Minneapolis-Honeywell Regulator Company, Minneapolis, Minn., a corporation of Delaware Application May 6, 1950, Serial No. 160,519

2 Claims. (Cl. 339—112)

Electronic discharge devices more familiarly known as electronic tubes, are frequently subjected to continuous vibration and extreme shock when used in our present day portable, mobile, and aircraft radio equipment. Such electronic tubes whether they be metal or glass are designed primarily to be mounted with the external prongs of the tube placed in an associated tube connecting socket. Especially in aircraft applications it is frequently found that this tube and socket connection is not of sufficient strength to support the electronic discharge device during normal use. While these electronic tubes are often small, they often control relatively large amounts of power which increases the operating temperature of the tube. A means of increasing the thermal radiation area of the tube or increasing the quantity of heat that is conducted away from the tube can be beneficial in producing better operation of the electronic device. Numerous tube clamping devices have been proposed to hold an electronic discharge device in an associated tube socket. Some of these devices are designed only to support the tube while others have special features such as: providing for variations in the size of the discharge device, providing for variations in the position of the tube with respect to the associated socket, providing a means of increasing the effective surface radiation area of the tube, and providing a means for the conduction of heat from the tube to a common mounting base. While such devices have provided a satisfactory means for clamping electron discharge devices in the normal case, it has been found that in many cases there still is not sufficient provision for conducting heat away from the discharge device. Furthermore, while provision has been made in such devices for adjusting for lateral variations of the tube, such adjustment has been rather difficult to make and also has tended to result in a connection between the clamping device and the base having a relatively low heat conductivity.

It is an object of the present invention to provide a clamping device with an improved thermal connection between the mounted tube and the mounting base so that a greater amount of heat will be conducted from the tube to the mounting base.

A further object of the present invention is to provide such a clamping device in which the clamping device has a substantial portion in intimate thermal conductive engagement with the mounting base so as to increase the heat conductivity from the tube to the base.

A further object of the present invention is to provide a clamping device for a tube in which provision is made for accommodating for lateral variation in the position of the tube by a relatively simple adjustment which still provides an adequate amount of heat conductivity between the clamping device and the base.

A still more specific object of the invention is to provide such a clamping device in which the device is held in yieldable pivotal relation to a mounting base in such a manner as to provide for the members of the device to be held in intimate engagement with the mounting base while permitting movement of the members with respect to the base either to accommodate for variation in the position of the tube or to facilitate insertion and removal of the tube from a clamping device.

These objects are accomplished in my device by the use of two semicylindrical metallic members that are designed to tightly enclose an electronic discharge device with a metal casing. A substantial portion of each of the two members is held in intimate engagement with the common mounting base. This engagement provides an improved thermal conductive path between the members and the mounting base. The means, comprising a pin and a spring combination, attaching the members to the mounting base not only provides an improved flexible mounting to allow movement of the members in a direction parallel to the base, but the means provides a yieldable connection urging the members into engagement with the base and for divergent movement of the members when the electronic tube is to be removed.

Other objects of the present invention will be disclosed in the course of the following specification, reference being made to the accompanying drawing.

Figure 1:
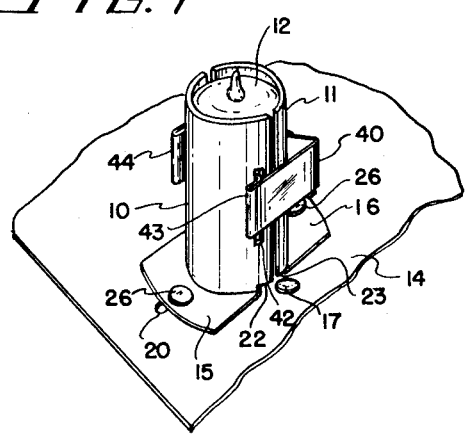
Figure 1 is a perspective view of the invention having the two semi-cylindrical members attached to a common base and latched in a position to surround the electronic discharge tube.
Figure 2:
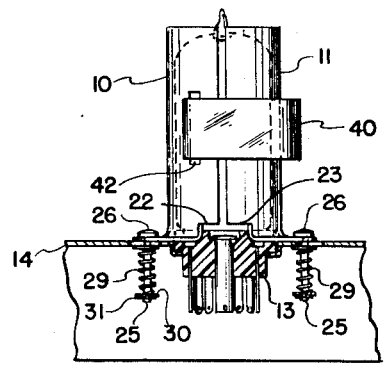
Figure 2 is a front elevational view of the invention having the two semi-cylindrical members surrounding the electronic discharge tube and particularly showing the means of attaching the two members to the common mounting base.
Figure 4:
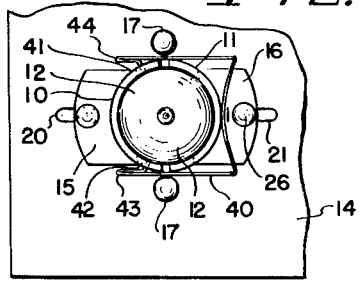
Figure 4 is a plan view of the invention showing the metallic enclosure surrounding the electronic discharge tube.

Referring to Figures 1 and 2 of this invention, the clamping device embodies a pair of semi-cylindrical members 10 and 11 forming a hollow cylinder of thin black sheet metal which has a high thermal conductivity, about an electronic discharge tube. The semi-cylindrical members 10 and 11 in combination enclose an electronic discharge tube 12 that is received by a tube socket 13 which is securely mounted by the rivets 17 in a common base 14. A portion near the lower extremity of the semi-cylindrical member 10 is bent normal to the axis of the semi-cylindrical member to form a flange 15 integral therewith. Other portions at the lower end thereof and adjacent to each of the vertical edges of the semi-cylindrical member 10 are removed to form the two similar notches 22. The semi-cylindrical member 11 also has two similar notches 23 and a flange 16. Referring to Figure 4, two elongated holes 20 and 21 are located in the mounting base 14 diametrically opposite and adjacent to the electronic discharge device 12. The elongated holes 20 and 21 are positioned so that the long dimensions of the holes are contained in a line extending through the central axis of the electronic discharge tube. A hole in each of the members 10 and 11 is centrally located in the flanges 15 and 16, respectively.

Figure 3:
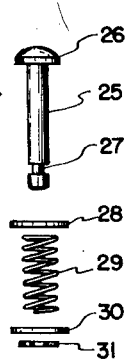
Figure 3 is an enlarged view of the pin and lock-washer assembly used to attach each of the two semi-cylindrical members of this invention to the common mounting base.

Referring to Figure 3, one particular embodiment of an attachment means is shown. This particular assembly consists of a pivot pin 25 having a head 26 and an annular groove or notch 27 extending around the periphery of the pivot pin 25 at one end thereon, a washer 28, a helical spring 29, a washer 30, and a lock-washer 31 adapted to be securely received into the notch 27 of the pivot pin 25. When the holes of the flanges 15 and 16 are aligned with the elongated holes 20 and 21 in the mounting base 14 to receive the pivot pins 25, the remaining parts of the attachment means can be assembled on the pivot pin from beneath the mounting base A in a manner shown in Figure 2.

Referring to Figure 4, a spring clip 40 consisting of a long rectangular thin piece of spring metal is attached at its mid point to a point on the periphery of the semi-cylindrical member 11 midway between the upper and lower extremities and midway between the two lateral edges on the periphery of the semi-cylindrical member. When the two semi-cylindrical members 10 and 11 are engaged in a position about the electronic discharge tube 12 the opposite ends of the spring clip 40 are adapted to be received into two similar long rectangular holes 41 and 42 in the semi-cylindrical member 10 that are placed midway between the upper and lower extremities of the semi-cylindrical member and having the long dimension of the two holes adjacent to the two diametrically opposite lateral edges of the semi-cylindrical member 10. The spring clip 40 is formed in such a manner that the opposite ends 43 and 44 of the spring clip when engaged in the holes of the semi-cylindrical member 10 results in a resilient compression engagement of the semi-cylindrical members 10 and 11 about the electronic discharge tube 12. The notches 22 and 23 in the semi-cylindrical members 10 and 11, respectively, eliminate interference between the members and the rivets 17.

When the electronic discharge tube 12 is mounted in the tube socket 13 and the two semi-cylindrical members 10 and 11 are engaged about the electronic discharge tube, the two semi-cylindrical members 10 and 11 provide an increased heat radiation area for the electronic discharge tube. The thermal conductive cooperation of the two flanges 15 and 16 with the mounting base 14 provides a thermal conductive path from the electronic discharge tube 12, for heat developed therein, through the two semi-cylindrical members 10 and 11 to the common mounting base 14. The black surface of the two members increases the heat transfer from the tube to the members. The attachment means comprising the pivot pin 25 and the helical spring 29 maintains an intimate engagement between the two flanges 15 and 16 and the common mounting base, thereby assisting the thermal conductive cooperation of the two semi-cylindrical members 10 and 11 and the common mounting base.

Figure 5:
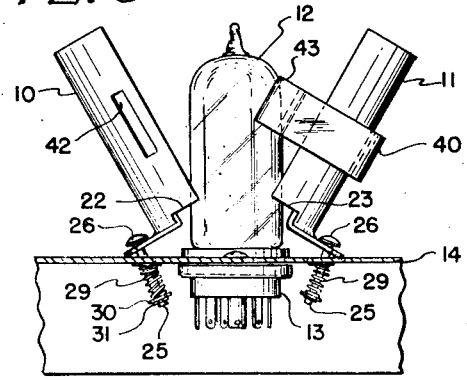
Figure 5 is a front elevational view of the invention, having the two metallic members separated and away from the electronic discharge tube to indicate the accessibility of the electronic discharge tube.

Referring to Figure 5 of the two semi-cylindrical members 10 and 11 can be pivoted about the flanges 15 and 16 in a transverse direction away from the electronic discharge tube 12. The pivot pin 25 is adapted to move outward from the electronic discharge tube by means of the elongated holes 20 and 21 in the mounting base 14 thereby increasing the divergence of the two semi-cylindrical members 10 and 11 from the electronic discharge device 12. This divergence increases the accessibility to the electronic discharge device when such a device is to be removed and replaced.

The two semi-cylindrical members 10 and 11 being pivotally mounted by means of the pivot pin 25 and adjustable by means of the elongated holes 20 and 21 in the mounting base 14 are adapted to be moved as a unit in a direction parallel to the mounting base 14 to accommodate for variations in the lateral position of the electronic discharge tube envelope with respect to the mounting base 14.

Numerous objects and advantages of my invention have been set forth in the foregoing description, together with details of the structure and function of the invention, and the novel features thereof are pointed out in the appended claims. The disclosure, however, is illustrative only, and I may make changes in detail, within the principle of the invention, to the full extent indicated by the broad general meaning of the terms in which the appended claims are expressed.

In considering this invention it should be kept in mind that the present disclosure is intended to be illustrative only and the scope of the invention is to be determined only by the appended claims.

I claim as my invention:

1. A clamping device for an electronic discharge tube comprising in combination; a base member having a socket adapted to support the tube; at least two tube engaging members having good thermal conductivity, said tube engaging members each being of a height substantially as great as that of the tube and formed so as to substantially enclose said tube and embrace said tube in heat conductive engagement over a large portion of the area of said tube, and each member having a relatively large flange in engagement with said base member; pivotal mounting means for each of said tube engaging members comprising a pivot pin extending through aligned openings in said flange and said base member, at least one of said openings associated with each of said mounting means being elongated to enable movement of said members transversely apart from engagement with the electronic discharge tube to permit grasping the tube for withdrawal from the socket of the base member; yieldable means associated with each of said pivot pins for maintaining said flange in thermal conductive engagement with said base member; and latch means for locking said tube clamping members firmly about said electronic discharge tube.

2. A clamping device for an electronic discharge tube having a base portion and an elongated cylindrical envelope comprising in combination; a base member having a socket adapted to support the base portion of the tube; two semicylindrical tube engaging members having good thermal conductivity, said tube engaging members each being of a height substantially as great as and of substantially the same radius as the tube envelope so as to substantially enclose said tube and embrace said tube in heat conductive engagement over a large portion of the area of said tube, and each member having a relatively large flange in engagement with said base member; pivotal mounting means for each of said tube engaging members comprising a pivot pin extending through aligned openings in said flange and said base member, at least one of said openings associated with each of said mounting means being elongated to enable movement of said members transversely apart from engagement with the electronic discharge tube to permit grasping the tube for withdrawal from the socket of the base member; yieldable means associated with each of said pivot pins for maintaining said flange in thermal conductive engagement with said base member; and latch means for locking said tube clamping members firmly about said electronic discharge tube.

OLIVER E. SAARI.

References Cited in the file of this patent

UNITED STATES PATENTS

| Number | Name | Date |
|---|---|---|
| 2,050,885 | Hafecost et al. | Aug. 11, 1936 |
| 2,067,323 | Hirsch | Jan. 12, 1937 |
| 2,257,232 | Flint | Sept. 30, 1941 |
| 2,499,612 | Staver | Mar. 7, 1950 |
| 2,543,740 | Ridgely | Feb. 27, 1951 |
| 2,601,027 | Keim | June 17, 1952 |

FOREIGN PATENTS

| Number | Country | Date |
|---|---|---|
| 480,744 | Great Britain | Feb. 28, 1938 |